(12) United States Patent
Praznik et al.

(10) Patent No.: US 7,188,884 B2
(45) Date of Patent: Mar. 13, 2007

(54) HINGED VEHICLE BODY PART AND METHOD OF USING AND MAKING SAME

(75) Inventors: Franc Praznik, Leonberg (DE); Leszek Wrobel, Rutesheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 133 days.

(21) Appl. No.: 10/998,574

(22) Filed: Nov. 30, 2004

(65) Prior Publication Data

US 2005/0121934 A1 Jun. 9, 2005

(30) Foreign Application Priority Data

Dec. 9, 2003 (DE) .............................. 103 57 370

(51) Int. Cl.
*B62D 25/10* (2006.01)
(52) U.S. Cl. .................................... 296/76; 296/146.11
(58) Field of Classification Search ........... 296/193.11, 296/146.11, 76, 100.06, 100.05
See application file for complete search history.

(56) References Cited

U.S. PATENT DOCUMENTS

| | | | | |
|---|---|---|---|---|
| 2,871,505 A | * | 2/1959 | Clark et al. .................... | 16/308 |
| 2,901,285 A | * | 8/1959 | Walker ........................ | 296/37.1 |
| 3,643,755 A | * | 2/1972 | Gionet et al. ............. | 180/69.21 |
| 4,886,312 A | | 12/1989 | Asoh | |
| 5,419,012 A | * | 5/1995 | Lewis .......................... | 16/306 |
| 5,967,586 A | * | 10/1999 | Duffy et al. .................. | 296/76 |
| 6,000,747 A | * | 12/1999 | Sehgal et al. ............. | 296/146.8 |
| 6,247,744 B1 | * | 6/2001 | Townsend et al. ...... | 296/146.11 |
| 6,382,704 B1 | * | 5/2002 | Nastasoiu ............... | 296/146.11 |
| 6,453,511 B2 | * | 9/2002 | Sato ............................ | 16/360 |
| 6,454,339 B2 | * | 9/2002 | Wilde et al. .................. | 296/76 |
| 6,505,875 B1 | * | 1/2003 | Laper .......................... | 296/43 |
| 6,568,495 B1 | * | 5/2003 | Corder et al. .............. | 180/69.2 |
| 6,719,354 B2 | * | 4/2004 | Holt ....................... | 296/146.11 |
| 6,799,788 B2 | * | 10/2004 | Plesternings ........... | 296/107.08 |
| 6,824,196 B2 | * | 11/2004 | Neidlein ................. | 296/146.11 |

(Continued)

FOREIGN PATENT DOCUMENTS

DE 34 26 287 1/1986

(Continued)

*Primary Examiner*—Lori L. Coletta
(74) *Attorney, Agent, or Firm*—Crowell & Moring LLP

(57) ABSTRACT

A hinged vehicle body part for a motor vehicle is inserted into an opening of a vehicle body and, on its circumference side, is surrounded by stationary vehicle body parts. For linking the hinged body part, hinges are connected on one side with the hinged vehicle body part and are connected on the other side with a stationary vehicle body part. So that the hinged body part can be adjusted in its closed state in the correct position with respect to the adjoining vehicle body and can be fixed in the adjusted position, it is provided that at least one fastening point of each hinge provided on the stationary body part is arranged outside the contour of the hinged vehicle body part. These fastening points, which are situated outside the contour of the hinge part, can be covered by a releasably fastened assembly part of the adjoining stationary vehicle body part.

24 Claims, 5 Drawing Sheets

U.S. PATENT DOCUMENTS

| | | |
|---|---|---|
| 2001/0005920 A1 | 7/2001 | Kim |
| 2002/0096905 A1* | 7/2002 | Nicholas et al. ............... 296/76 |
| 2003/0038500 A1* | 2/2003 | Aubry et al. ................. 296/76 |
| 2004/0084928 A1* | 5/2004 | Bacon ................... 296/100.06 |
| 2004/0178654 A1* | 9/2004 | Hahn .......................... 296/76 |
| 2005/0280278 A1* | 12/2005 | Henderson ............. 296/100.06 |

FOREIGN PATENT DOCUMENTS

| | | |
|---|---|---|
| JP | 56067668 | 6/1981 |
| JP | 2002-206368 | 7/2002 |

* cited by examiner

HINGED VEHICLE BODY PART AND METHOD OF USING AND MAKING SAME

BACKGROUND AND SUMMARY OF THE INVENTION

This application claims the priority of German Application No. 103 57 370.4-21 filed Dec. 9, 2003, the disclosure of which is expressly incorporated by reference herein.

The invention relates to a hinged vehicle body part, such as a lid, a flap, a hood or the like for a motor vehicle. Certain preferred embodiments of the invention relate to a hinged vehicle body part which is inserted into an opening of the vehicle body and is circumferentially surrounded by stationary vehicle body parts, hinges being provided for the linking of the hinged body part, which hinges are connected on one side with the hinged vehicle body part and are connected on another side with an adjoining stationary vehicle body part.

Hinged vehicle body parts on motor vehicles are manually adjusted during the production. In the known arrangement, the mounting in the body shell takes place by a repeated opening and closing of the hinged vehicle body part, with releasing and tightening of the fastening screws until the optimal joint measurements have been reached circumferentially. The hinged component has to be manually aligned between the two opposite side parts in the Y-direction and additionally in the X-direction. The fixing of the hinged vehicle body part takes place in the opened condition of the hinged component. Depending on the mechanic's skill, a repeated correcting of the position of the hinged component is necessary during the mounting, which results in high, time-intensive mounting expenditures.

It is an object of the invention to take such measures on a hinged component that the mounting expenditures are clearly reduced and that, already in its closed state, the hinged component can be adjusted in the correct position with respect to the adjoining body structure and can be fixed in the adjusted position.

According to certain preferred embodiments of the invention, this object is achieved by providing a hinged vehicle body part, such as a lid, a flap, a hood, or the like, for a motor vehicle, which is inserted into an opening of the vehicle body and is circumferentially surrounded by stationary vehicle body parts, hinges being provided for the linking of the hinged body part, which hinges are connected on one side with the hinged vehicle body part and are connected on another side with an adjoining stationary vehicle body part, wherein at least one fastening point of each hinge assigned to the stationary vehicle body part is arranged outside a contour of the hinged vehicle body part, and wherein the adjoining stationary vehicle body part is formed by an interior part and a releasably fastenable exterior part constructed as an assembly part, the exterior part covering respective fastening points of the hinged vehicle body part which are situated outside of the contour of the hinged vehicle body part.

Important advantages achieved by means of the invention are that, as a result of the fastening points for the hinged vehicle body part which are situated outside the contour of the hinged vehicle body part, only a one-time adjusting and fastening of the hinged body part is required, whereby the mounting expenditures are clearly reduced and a visually attractive course of the joints can always be achieved. Already in its closed position, the hinged vehicle body part can be adjusted and fixed from the exterior side. The fastening points of the hinge situated outside the hinged vehicle body part are covered by an assembly part which forms an exterior part of the adjoining stationary vehicle body part, in which case the exterior part can be releasably fastened to an interior part situated below it. According to certain preferred embodiments of the invention, the assembly part is fastened by means of push-in connections, screwed connections or the like to the stationary interior part of the vehicle body part. This construction principle can be used in the rearward area as well as in the forward area of a motor vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
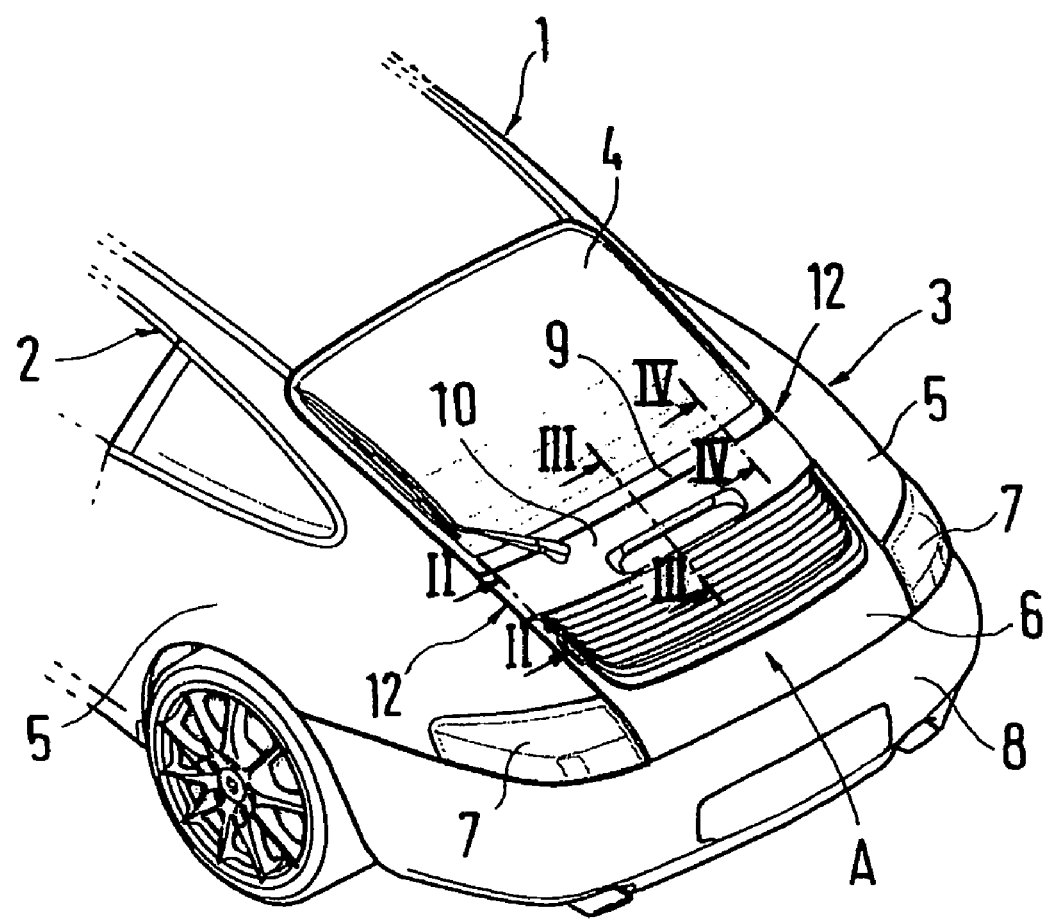
FIG. 1 is a perspective partial view diagonally from the rear onto the rearward area of a motor vehicle having a hinged vehicle body part, constructed according to a preferred embodiment of the present invention.

The motor vehicle 1 formed as a passenger car has a vehicle body 2 which, in the illustrated rearward area 3, comprises a rear window 4, side parts 5, a hinged body part 6, rear lights 7 and a rearward end part 8. A transversely extending stationary vehicle body part 10, which connects the two side parts 5 with one another, extends between the lower edge 9 of the rear window 4 and the hinged vehicle body part 6. In the embodiment shown, the vehicle body part 10 forms a rear cross member.

The hinged vehicle body part 6 is inserted into an opening 11 of the vehicle body 2 and is bounded at the top by the vehicle body part 10, laterally by the side parts 5 and at the bottom by the rearward end part 8. Adjacent to the stationary vehicle body part 10, the hinged vehicle body part 6 is connected on both longitudinal sides 12 by way of one hinge 13 respectively with the stationary vehicle body part 2, and by means of the two hinges 13, can be displaced from a closed position A into a swung-up opening position, which is not shown in detail, and vice-versa. On the side of the hinged vehicle body part 6 facing away from the two hinges 13, a releasable locking device, which is not shown in detail, for the hinged vehicle body part is provided.

The hinged body part 6 is formed by a hood, a flap, a lid, or the like.

Each hinge 13 is, on the one side, connected with the hinged body part 6 and, on the other side, with the adjacent stationary vehicle body 2 (stationary vehicle body part 10), preferably by means of releasable fastening devices, such as screwed connections, or the like. In the embodiment shown, the hinges 13 are constructed as multi-joint hinges, such as four-joint hinges. Each hinge 13 comprises a supporting part 14 fastened to the stationary body 2, a holding part 15 fastened to the hinged body part 6 as well as two control arms 16, 17 whose one set of ends 18, 19 are hinged to the supporting part 14 and whose other ends 20, 21 are hinged to the holding part 15.

So that the hinged body part 6 can be adjusted already in the closed state A in the correct position with respect to the adjoining stationary vehicle body 2 (uniform surrounding course of joints) and can be fixed in the adjusted position, it is provided that at least one fastening point 22 of each hinge 13 assigned to the stationary body part 10 is arranged outside the contour of the hinged vehicle body part 6. The fastening points 22 are preferably constructed as screwed connections 23.

Figure 2:
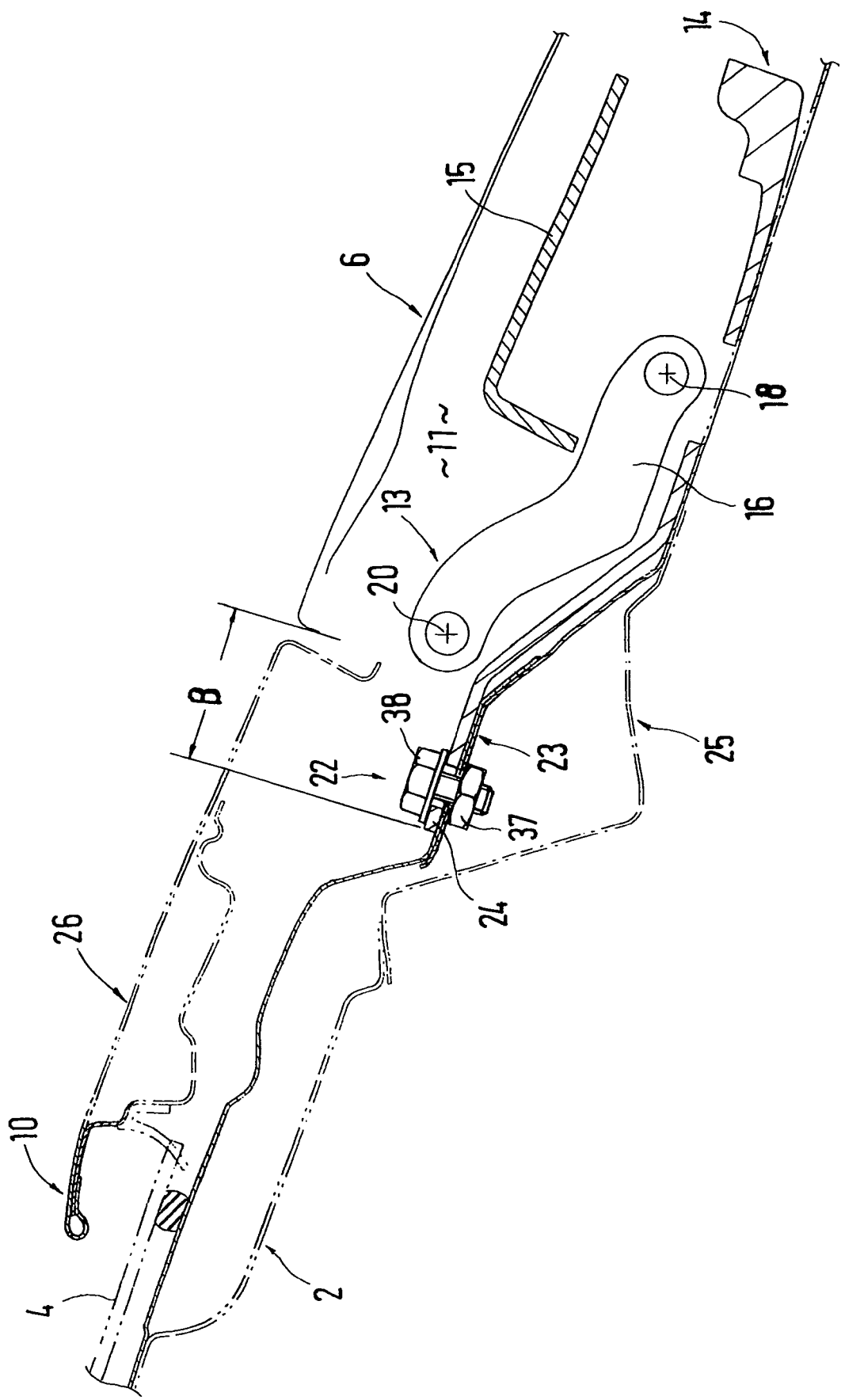
FIG. 2 is an enlarged sectional view taken along the plane of Line II—II of FIG. 1.
Figure 5:
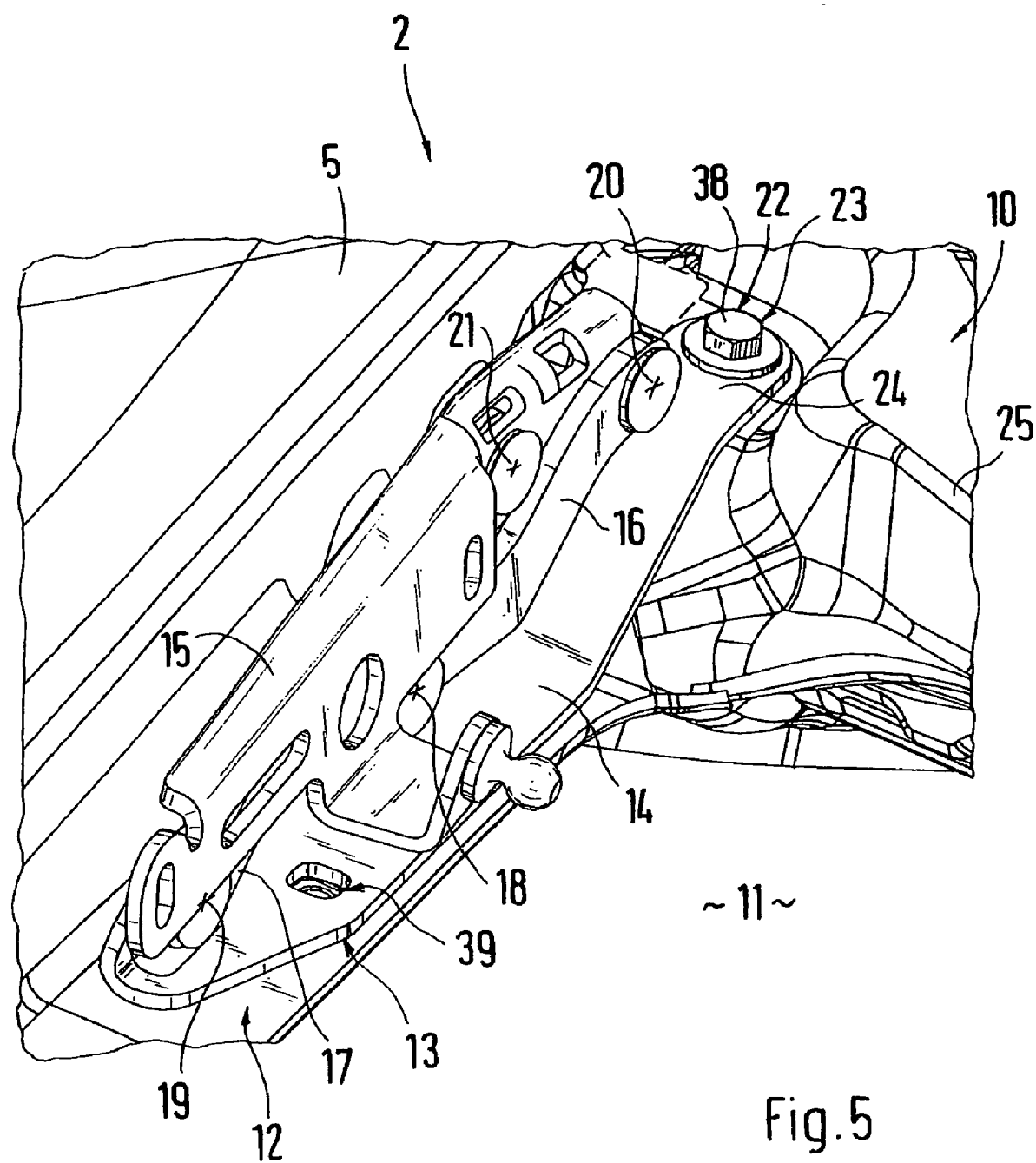
FIG. 5 is a perspective partial view of a rear-side opening of a vehicle body with a hinge for the hinged vehicle body part, constructed in accordance with the illustrated preferred embodiments of the invention.

According to FIGS. 2 and 5, a bent-away pulled-up end area 24 of the supporting part 14 of each hinge 13 is lengthened by an extent B beyond the hinged vehicle body part 6 toward the front. In this projecting end area 24, the releasable screwed connection 23 of the supporting part 14 to the stationary vehicle body part 10 takes place.

The hinged vehicle body part 6 is preferably adjusted by means of an assembling jig in the correct position with respect to the adjoining stationary body 2.

The stationary vehicle body part 10 is formed by an interior part 25 and by a releasably fastened exterior part 26 constructed as an assembly, the exterior part 26 covering the hinge-side fastening points 22 of the hinged vehicle body part 6 which are disposed in front of the hinged vehicle body part 6.

The interior part 25 has a multi-shell hollow-support-type construction and accommodates the rearward edge of the adjoining glued-in rear window 4. The exterior part 26, which in areas forms the body outer skin, has a two-shell construction and accommodates an additional brake light 27 in a center area of its transverse dimension (FIG. 3).

In a rearward area 28 and in an area 29 situated farther to the front, the exterior part is locally connected by way of screwed connections 30, 31 with the interior part 25 situated below.

Figure 3:
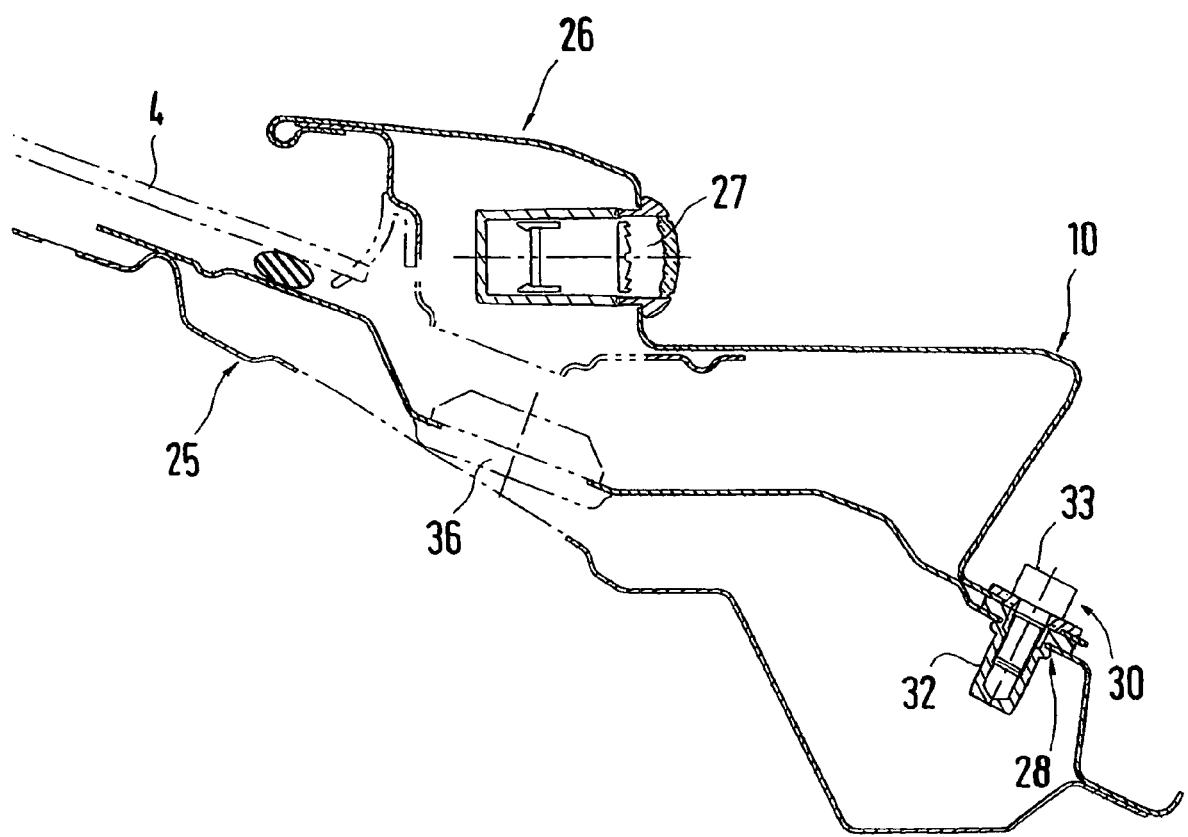
FIG. 3 is an enlarged sectional view taken along the plane of Line III—III of FIG. 1.

The rearward screwed connections 30 are formed by threaded receiving devices 32 which are provided on the interior part 25 and into which fastening screws 33 are screwed from the top (FIG. 3). The threaded receiving devices have constructions which are closed toward the bottom.

Figure 4:
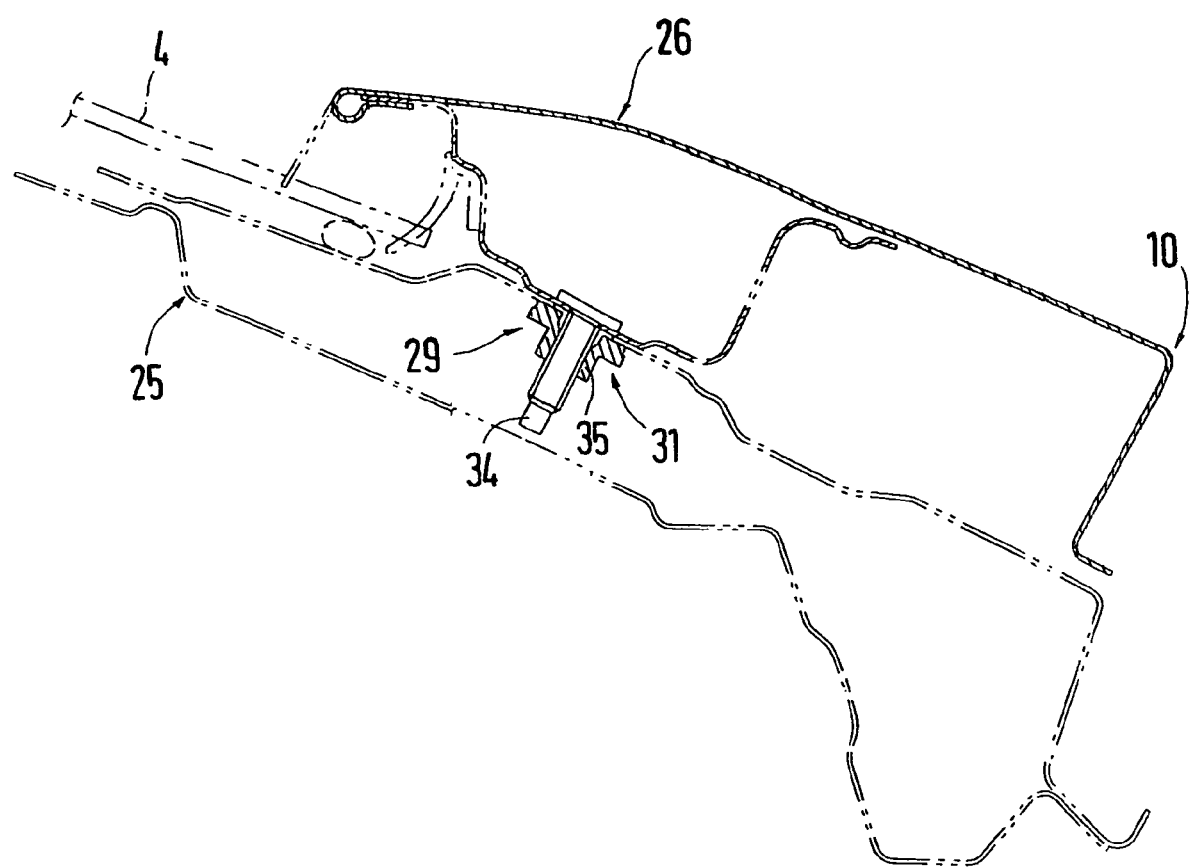
FIG. 4 is an enlarged sectional view taken along the plane of Line IV—IV of FIG. 1.

According to FIG. 4, the forward screwed connections 31 comprise threaded bolts 34 which are arranged on the inner shell of the exterior part 26, project downward in areas and onto which fastening nuts 35 are screwed from below. The screwed connections 31 are covered by inserted rubber bushings 36.

Each screwed connection 23 for fastening the hinged vehicle body part 6 comprises a threaded nut 37 provided on the interior part 25, into which threaded nut 37 a fastening screw 38 is screwed from above (FIG. 2).

After the tightening of the two forward fastening screws 38 of the screwed connections 23, the hinged vehicle body part 6 is adjusted in the correct position with respect to the adjoining vehicle body 2 and can be opened, so that rearward screwed connections, which are not shown in detail and are provided at reference number 39 between the hinge 13 and the stationary vehicle body 2, can be tightened on both hinges 13 (FIG. 5).

Such a fastening concept for a hinged vehicle body part 6 can be implemented in the rearward area as well as in the forward area of a vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Hinged vehicle body part, assembly for a motor vehicle, comprising a hinged body part insertable into an opening of the vehicle body so as to be circumferentially surrounded by stationary vehicle body parts, and hinges for linking of the hinged body part, and operatively connected on one side with the hinged body part and on another side with an adjoining stationary vehicle body part, wherein at least one fastening point of each hinge assigned to the stationary vehicle body part is arranged outside a contour of the hinged body part, and the adjoining stationary vehicle body part is formed by an interior part and a releasably fastenable exterior part constructed as an assembly, the exterior part covering respective fastening points of the hinged body part which are situated outside the contour of the hinged body part.

2. Hinged vehicle body part assembly according to claim 1, wherein the fastening points of each hinge provided on the stationary body part are constructed as screwed connections.

3. Hinged vehicle body part assembly according to claim 1, wherein an end area of a supporting part of each hinge is lengthened beyond the hinged body part to form a projecting end area, the releasable screwed connection of the supporting part on the stationary vehicle body part taking place in this projecting end area.

4. Hinged vehicle body part assembly according to claim 1, wherein the hinged body part is adjusted by an assembly jig in a correct position with respect to an adjoining vehicle body part.

5. Hinged vehicle body part assembly according to claim 2, wherein the hinged body part is adjusted by means of an assembly jig in a correct position with respect to an adjoining vehicle body part.

6. Hinged vehicle body part assembly according to claim 3, wherein the hinged body part is adjusted by means of an assembly jig in a correct position with respect to an adjoining vehicle body part.

7. Hinged vehicle body part assembly according to claim 1, wherein the exterior part has a two-shell construction and locally accommodates an additional brake light.

8. Hinged vehicle body part assembly according to claim 2, wherein the exterior part has a two-shell construction and locally accommodates an additional brake light.

9. Hinged vehicle body part assembly according to claim 3, wherein the exterior part has a two-shell construction and locally accommodates an additional brake light.

10. Hinged vehicle body part assembly according to claim 4, wherein the exterior part has a two-shell construction and locally accommodates an additional brake light.

11. Hinged vehicle body part assembly according to claim 5, wherein the exterior part has a two-shell construction and locally accommodates an additional brake light.

12. Hinged vehicle body part assembly according to claim 6, wherein the exterior part has a two-shell construction and locally accommodates an additional brake light.

13. Hinged vehicle body part assembly according to claim 7, wherein the exterior part is connected by screwed connections with the interior part of the vehicle body part situated therebelow.

14. Hinged vehicle body part assembly according to claim 8, wherein the exterior part is connected by screwed connections with the interior part of the vehicle body part situated therebelow.

15. Hinged vehicle body part assembly according to claim 9, wherein the exterior part is connected by screwed connections with the interior part of the vehicle body part situated therebelow.

16. Hinged vehicle body part assembly according to claim 10, wherein the exterior part is connected by screwed connections with the interior part of the vehicle body part situated therebelow.

17. A method of assembling a hinged vehicle body part assembly for a motor vehicle, comprising a hinged body part insertable into an opening of the vehicle body so as to be circumferentially surrounded by stationary vehicle body parts, and hinges for linking of the hinged body part, and operatively connected on one side with the hinged body part and on another side with an adjoining stationary vehicle body part, wherein
 at least one fastening point of each hinge assigned to the stationary vehicle body part is arranged outside a contour of the hinged body part, and
 the adjoining stationary vehicle body part is formed by an interior part and a releasably fastenable exterior part constructed as an assembly, the exterior part covering respective fastening points of the hinged body part which are situated outside the contour of the hinged body part, comprising:
 inserting the hinged body part in said opening,
 adjustably positioning the hinged body part to be aligned with contours of the vehicle body at a circumference of the opening,
 fastening the hinged body part by fasteners at the at least one fastening point, and
 subsequently fastening the releasably fastenable exterior part to cover the respective fastening points.

18. A hinge assembly for hingedly supporting a movable vehicle body panel member at an opening surrounded at least in part by stationary vehicle body panel structure, comprising:
 first and second hinge members which are pivotally connected with one another, said first hinge member being connected in use with the movable body panel member and said second hinge member being connected in use with a stationary vehicle part,
 said second hinge member including a fastening point located in use outside contours of the movable body panel member so that said second hinge member can be adjustably positioned to position the movable body member with respect to the vehicle body panel structure.

19. A hinge assembly according to claim 17, wherein said fastening point includes an opening for a threaded fastener.

20. A vehicle assembly comprising:
 a body panel structure which in use surrounds an opening, said body panel structure including a releasably fastenable exterior panel part, and
 a movable body panel assembly having a movable body panel member connected with a hinge assembly operable to accommodate movement of the movable body panel member between respective positions opening and closing the opening,
 wherein said hinge assembly comprises:
 first and second hinge members which are pivotally connected with one another, said first hinge member being connected in use with the movable body panel member and said second hinge member being connected in used with a stationary vehicle part,
 said second hinge member including a fastening point located in use outside contours of the movable body panel member so that said second hinge member can be adjustably positioned to position the movable body member with respect to the vehicle body panel structure.

21. An assembly according to claim 20, wherein said fastening point includes an opening for a threaded fastener.

22. An assembly according to claim 20, wherein said releasably fastenable exterior panel part is operable to cover said fastening point.

23. A method of making a vehicle body assembly comprising:
 a body panel structure which in use surrounds an opening, said body panel structure including a releasably fastenable exterior panel part, and
 a movable body panel assembly having a movable body panel member connected with a hinge assembly operable to accommodate movement of the movable body panel member between respective positions opening and closing the opening,
 wherein said hinge assembly comprises:
 first and second hinge members which are pivotally connected with one another, said first hinge member being connected in use with the movable body panel member and said second hinge member being connected in used with a stationary vehicle part,
 said second hinge member including a fastening point located in use outside contours of the movable body panel member so that said second hinge member can be adjustably positioned to position the movable body member with respect to the vehicle body panel structure, comprising:
 placing the movable body panel assembly into the opening,
 adjustably moving the movable body panel assembly to a position where the movable body panel member is aligned with surrounding body panel structure when said hinge assembly is in an opening closing position,
 fastening the movable body panel assembly in the adjusted position using the fastening point, and
 subsequently fastening the releasably fastenable exterior panel part in position to cover the fastening points.

24. A method according to claim 23, wherein said fastening point includes means for a threaded connector connection of the second hinge member to the stationary vehicle part.

* * * * *